R. P. LINK.
AIR MOISTENER.
APPLICATION FILED NOV. 26, 1919.
1,418,942. Patented June 6, 1922.
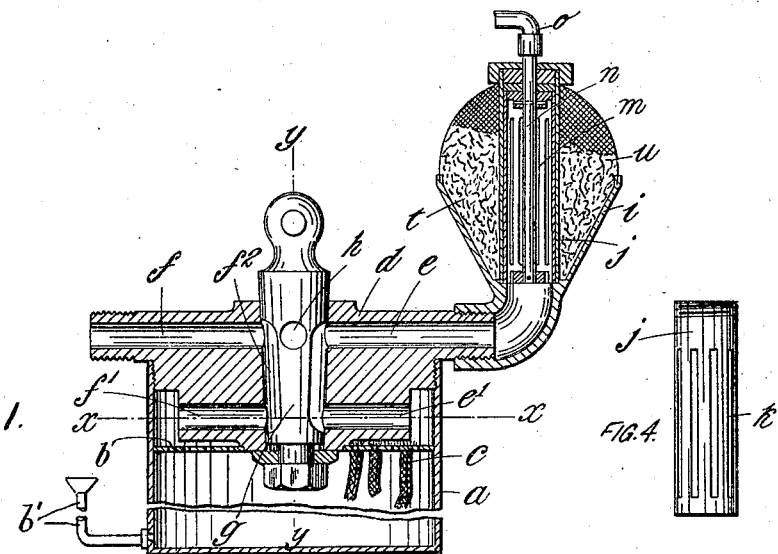
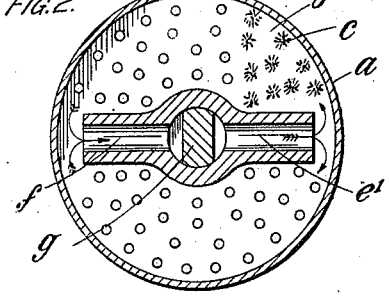
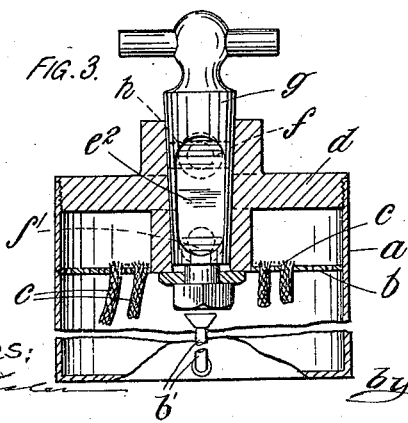
INVENTOR
Rolls P. Link

UNITED STATES PATENT OFFICE.

ROLLS PERCIVAL LINK, OF WINCHMORE HILL, ENGLAND.

AIR MOISTENER.

1,418,942.  Specification of Letters Patent.  Patented June 6, 1922.

Application filed November 26, 1919. Serial No. 340,845.

*To all whom it may concern:*

Be it known that I, ROLLS PERCIVAL LINK, a citizen of the United States, and residing at Winchmore Hill, in the county of Middlesex, England, have invented new and useful Improved Air Moisteners, of which the following is a specification.

This invention relates to improved humidifying apparatus comprising a closed vessel divided into two parts by a horizontally arranged perforated plate wherein the space below this plate is packed with wicks made of a suitable absorbent material and the ends of these wicks are introduced through the perforations in the said plate so that they project into the space above this plate. The said space above the plate forms a conduit which is interposed in the air supply duct admitting air to the carburettor, auxiliary air supply duct, as may be found most advantageous or convenient.

A suitable form of valve is provided for controlling the supply of air entering the humidifying apparatus, and means are moreover provided for filtering the entering air, that is to say for trapping dust or the like which would otherwise enter the apparatus with the air.

In the accompanying drawing:—

Figure 1 shows a vertical section of the upper part of a humidifying apparatus according to this invention.

Figure 2 shows a section on the line $x, x$, Figure 1, and

Figure 3 shows a section on the line $y, y$, Figure 1, and

Figure 4 is a detail view of one member of a valve controlling the admission of air to the apparatus.

As shown in the drawing, $a$ is a vessel divided into upper and lower parts by a perforated plate $b$ through which project the ends of wicks $c$ packed in the space below the plate $b$. The space above the plate $b$ is closed by a cap $d$ in which conduits $e$ $e'$ and $f$, $f'$ are formed.

A plug valve $g$ seated in the cap $d$ has a port $e^2$ by which the conduit $e$ can be put in communication with the conduit $e'$ and a port $f^2$ by which the conduit $f'$ can be put into communication with the conduit $f$. Air entering through $e'$ passes to $f'$ as indicated by arrows in Figure 2, through the space above the plate $b$ into which the ends of the wicks $c$ project. The valve $g$ also has a port $h$ so that if it is desired to put the humidifying apparatus out of operation the conduits $e$, $f$ may be put into direct communication and then communication between these conduits and the conduits $e'$, $f'$ is cut off.

When this apparatus is in use for humidifying the air supplied to an internal combustion engine the space below the plate $b$ is charged with water through the inlet $b'$ and then, the valve or valves of the engine being set for working in a moist atmosphere, the engine will run under practically constant conditions as regards humidity of the air supplied since any deficiency in humidity owing to change of atmosphere or atmospheric conditions will be made up by moisture taken up by the air or gaseous charge in its passage over the ends of the moistened wicks $c$ above the plate $b$ and the amount of moisture thus taken up will be in some degree proportional to the deficiency since when the air supply is derived from a very moist atmosphere little or no moisture will be taken up from the wicks and when this supply is derived from a very dry atmosphere a relatively large amount of moisture will be absorbed from the said wicks.

The inlet end of the conduit $e$ supports a cup or casing $i$ in which is fixed a stationary tube or sleeve $j$ having longitudinal or other slots $k$ formed in the wall thereof. A similarly slotted tube or sleeve $m$ is rotatably mounted in the stationary sleeve $j$ these two sleeves together forming a regulating valve since by adjustment of this inner or rotary sleeve the slots in the two sleeves can be moved into or out of register and thus the cross section of the open area through these slots can be varied. The rotary sleeve is provided with a suitable rod or handle $n$ by which its position can be adjusted and in a convenient arrangement this sleeve is connected by a flexible or other shaft $o$ so that it can be operated from a distance.

The cup or casing $i$ is packed with fibrous absorbent material $t$, such as cotton wool or other suitable filtering material surrounding the sleeves $j$, $m$ and retained within the said casing, if necessary, by a cap or covering $u$ of wire gauze or like perforated material.

By this arrangement the air is admitted to the humidifying apparatus in regulated quantity after being freed of dust or like particles which by accumulation might choke or otherwise interfere with the operation of the said apparatus.

In some cases the packing of absorbent material $t$ surrounding the slotted sleeves $j$, $m$ may be saturated with a suitable liquid so that the air passing therethrough is not only filtered but become charged or impregnated with the vapour of such liquid, for example, for the purpose of enriching a gaseous mixture of which this charged or impregnated air is a constituent.

With my improved apparatus for moistening the air or gaseous charge, after the engine valves have been once properly set, the engine will continue to run efficiently under widely different atmospheric conditions without further adjustment of the said valves.

I claim:—

1. In apparatus for humidifying air supplied to the cylinder of an internal combustion engine to form part of the charge, the combination of a vessel, a perforated plate dividing the said vessel into upper and lower spaces, wicks in the said lower space having their ends protruding through the perforations in the said plate into the upper space, a cap closing the said upper space, conduits in the said cap forming part of the air duct leading to the engine cylinder and comprising inlet and outlet branches respectively opening into and leading out from the said upper space at locations remote one from the other, and a multiple ported valve interposed in the said conduits having one of its ports controlling the inlet end of the said inlet branch and another port correspondingly controlling the outlet end of the said outlet branch.

2. In apparatus for humidifying air supplied to the cylinder of an internal combustion engine to form part of the charge, the combination of a vessel, a perforated plate dividing the said vessel into upper and lower spaces, wicks in the said lower space having their ends protruding through the perforations in the said plate into the upper space, a cap closing the said upper space, conduits in the said cap forming part of the air duct leading to the engine cylinder and comprising upper and lower inlet branches in alignment and upper and lower outlet branches in alignment the said lower branches opening directly into the said upper space, and a multiple ported valve arranged to control communication between the upper inlet and outlet branches, between the two inlet branches, and between the two outlet branches, respectively.

3. In apparatus for humidifying air supplied to the cylinder of an internal combustion engine to form part of the charge, the combination of a vessel, a perforated plate dividing the said vessel into upper and lower spaces, wicks in the said lower space having their ends protruding through the perforations in the said plate into the upper space, a cap closing said upper space, an inlet conduit and an outlet conduit in the said cap, a multiple ported valve controlling communication between the inlet conduit and the outlet conduit through said upper space and simultaneously controlling communication between said conduits directly, outside of the said upper space, and an independently operated valve regulating the admission of air to the said conduits.

ROLLS PERCIVAL LINK.

Witnesses:
 JOHN T. KNOWLES,
 GEO. HARRISON.